US011827237B2

(12) United States Patent
Kilaru et al.

(10) Patent No.: US 11,827,237 B2
(45) Date of Patent: Nov. 28, 2023

(54) SYSTEMS AND METHODS FOR REAL-TIME CRASH DETECTION USING TELEMATICS DATA

(71) Applicant: Toyota Connected North America, Inc., Plano, TX (US)

(72) Inventors: Raja Shekar Kilaru, Addison, TX (US); Akshata Dundi Mohan, Addison, TX (US); Nimish Kumar Amlathe, Plano, TX (US); Christian Gilles Claudel, Austin, TX (US)

(73) Assignee: Toyota Connected North America, Inc., Plano, TX (US)

( * ) Notice: Subject to any disclaimer, the term of this patent is extended or adjusted under 35 U.S.C. 154(b) by 498 days.

(21) Appl. No.: 16/736,070

(22) Filed: Jan. 7, 2020

(65) Prior Publication Data

US 2021/0197848 A1 Jul. 1, 2021

Related U.S. Application Data

(60) Provisional application No. 62/954,147, filed on Dec. 27, 2019.

(51) Int. Cl.
*B60W 50/14* (2020.01)
*B60W 40/114* (2012.01)
(Continued)

(52) U.S. Cl.
CPC ............ *B60W 50/14* (2013.01); *B60W 40/08* (2013.01); *B60W 40/107* (2013.01);
(Continued)

(58) Field of Classification Search
CPC ............ B60W 50/14; B60W 50/0097; B60W 50/0205; B60W 40/08; B60W 40/107;
(Continued)

(56) References Cited

U.S. PATENT DOCUMENTS

| | | | | |
|---|---|---|---|---|
| 6,002,974 A | * | 12/1999 | Schiffmann | ............. B60R 22/46 340/440 |
| 6,662,141 B2 | * | 12/2003 | Kaub | ................... G08G 1/0104 702/181 |

(Continued)

OTHER PUBLICATIONS

Quartix, "A three part solution for impact detection and analysis" accessed at: https://www.quartix.com/en-gb/vehicle-tracking-for-insurance/crash-detection/ on Jan. 6, 2020 (in 8 pages).

*Primary Examiner* — Bhavesh V Amin
(74) *Attorney, Agent, or Firm* — Christopher G. Darrow; Darrow Mustafa PC

(57) ABSTRACT

Systems, methods, and other embodiments described herein relate to improving crash prediction through correlating an observed response and a predicted response of a vehicle. In one embodiment, a method includes generating the predicted response for the vehicle as a function of a response model and according to current vehicle inputs that are control inputs associated with steering, braking, and accelerating the vehicle. The response model is a learning model that predicts behaviors of the vehicle. The method includes computing a residual indicating an extent of correlation between the predicted response and the observed response. The method includes, in response to determining the residual satisfies a crash threshold that indicates an anomaly between the predicted response and the observed response, providing an alert indicating the vehicle has likely crashed.

20 Claims, 6 Drawing Sheets

(51) Int. Cl.
  *B60W 40/107*  (2012.01)
  *G06N 20/00*  (2019.01)
  *B60W 40/08*  (2012.01)

(52) U.S. Cl.
  CPC ........... *B60W 40/114* (2013.01); *G06N 20/00* (2019.01); *B60W 2050/143* (2013.01); *B60W 2510/18* (2013.01); *B60W 2510/20* (2013.01)

(58) Field of Classification Search
  CPC ......... B60W 40/114; B60W 2050/143; B60W 2050/021; B60W 2510/18; B60W 2510/20; G06N 20/00
  See application file for complete search history.

(56) References Cited

U.S. PATENT DOCUMENTS

| | | | | |
|---|---|---|---|---|
| 7,044,742 | B2* | 5/2006 | Sumiya | G08B 23/00 |
| | | | | 434/350 |
| 8,639,426 | B2 | 1/2014 | Dedes et al. | |
| 9,165,477 | B2 | 10/2015 | Wilson | |
| 10,083,551 | B1* | 9/2018 | Schmitt | G07C 5/008 |
| 2002/0019697 | A1* | 2/2002 | Cong | G01S 13/723 |
| | | | | 701/300 |
| 2005/0278098 | A1* | 12/2005 | Breed | G01S 7/023 |
| | | | | 701/45 |
| 2008/0167820 | A1 | 7/2008 | Oguchi et al. | |
| 2008/0201042 | A1 | 8/2008 | Cuddihy et al. | |
| 2008/0306996 | A1 | 12/2008 | McClellan et al. | |
| 2009/0118949 | A1* | 5/2009 | Heap | B60K 6/365 |
| | | | | 701/55 |
| 2009/0306880 | A1* | 12/2009 | Gomi | G09B 9/052 |
| | | | | 703/8 |
| 2013/0024075 | A1* | 1/2013 | Zagorski | B60W 30/0956 |
| | | | | 701/1 |
| 2016/0059855 | A1 | 3/2016 | Rebhan et al. | |
| 2016/0094964 | A1* | 3/2016 | Barfield, Jr. | G08B 25/016 |
| | | | | 455/404.2 |
| 2017/0248950 | A1* | 8/2017 | Moran | G05D 1/0022 |
| 2017/0291602 | A1* | 10/2017 | Newman | G08G 1/166 |
| 2018/0251092 | A1 | 9/2018 | Lee et al. | |
| 2018/0326999 | A1* | 11/2018 | Hershkovitz | G06V 40/20 |
| 2019/0176846 | A1* | 6/2019 | Movert | G06N 3/088 |

* cited by examiner

SYSTEMS AND METHODS FOR REAL-TIME CRASH DETECTION USING TELEMATICS DATA

CROSS-REFERENCE TO RELATED APPLICATIONS

This application claims benefit of U.S. Provisional Application No. 62/954,147, filed on, Dec. 27, 2019, which is herein incorporated by reference in its entirety.

TECHNICAL FIELD

The subject matter described herein relates, in general, to crash prediction, and, more particularly, to identifying anomalies in the operation of a vehicle through a comparison of a predicted response extrapolated from telematics data of a vehicle and an observed response.

BACKGROUND

Vehicles may employ various safety systems to protect passengers, such as airbags, active/passive restraints, automated control assistance (e.g., anti-lock braking systems (ABS)), and so on. While these systems improve the safety of the passengers, they do not generally function to identify the occurrence of a crash. That is, the noted systems facilitate preventing crashes and/or protecting passengers against injury during a crash but may not support the identification of a crash event itself, and, thus, do not facilitate helping passengers after the crash through, for example, reliably dispatching emergency services, collecting crash data to further an understanding of how the crash occurred, and so on.

For example, in the case of airbags and/or other crash-related systems, the noted systems deploy when a specific sensor in the vehicle detects an impact. Such sensors may be placed in specific locations around the vehicle, such as in bumpers to detect physical contact beyond a threshold level, while other sensors such as accelerometers may detect generally forces imparted onto the vehicle exceeding a particular threshold. However, the noted systems generally rely on a particular detection event identified by one or more sensors. As such, the determination of a crash from the noted systems can be limited to a specific set of events such as crashes where airbags are to deploy, and so on. These circumstances correspond with a sub-set of crash events having particular characteristics. As such, there is a need for improved crash detection that reliably identifies all types of crash events.

SUMMARY

In one embodiment, example systems and methods relate to a manner of improving crash detection by using telematics data to predict vehicle responses and correlating the predicted responses with observed responses. As previously noted, reliably detecting crash events associated with a vehicle is a task that may encounter many difficulties. Therefore, an improved approach to crash detection is disclosed that leverages characteristics of telematics data to identify the occurrence of a crash instead of relying on discrete detections by particular sensors. For example, in one or more aspects, a disclosed system predicts a response of the vehicle using vehicle control inputs (e.g., steering, accelerator inputs, braking inputs) to generate a baseline for determining whether behaviors of the vehicle correspond with anomalies that may be indicative of a crash.

This predicted response identifies a behavior of the vehicle that is expected according to the inputs, and, for example, current dynamics of the vehicle. Thus, the predicted response is an expected behavior as determined, in one approach, according to a model that uses the noted data elements from the vehicle as inputs. As such, once the vehicle progresses to a temporal point corresponding with the predicted response, the system can then compare the predicted response with an observed response that identifies how the vehicle actually behaved over the subject time period. If, for example, the residual (e.g., difference or time series of differences) between the predicted and observed responses satisfies a threshold, then the system may conclude that the vehicle has encountered an anomaly in operation that may correlate with a crash. In one approach, the system can further validate the residual by, for example, analyzing sensor data about operation of the vehicle from a time after the occurrence of the anomaly.

This additional analysis may include analyzing sensor data about the operation of the vehicle during a time subsequent to the observed response, and in relation to a set of rules that define additional validating aspects of behaviors of the vehicle. Accordingly, in response to the residual satisfying the crash threshold and, thus, the identification of a crash event, the system may generate an alert. In various approaches, the alert may take different forms, but generally includes notifying emergency services, recording/communicating data about the event, and so on. In this way, the disclosed system improves the identification of crash events through analysis of available telematics data, thereby furthering the safety of the vehicle and passengers riding therein.

In one embodiment, a crash prediction system for improving crash prediction through correlating an observed response and a predicted response of a vehicle is disclosed. The crash prediction system includes one or more processors and a memory communicably coupled to the one or more processors. The memory stores a prediction module including instructions that when executed by the one or more processors cause the one or more processors to generate the predicted response for the vehicle as a function of a response model and according to current vehicle inputs that are control inputs associated with steering, braking, and accelerating the vehicle. The response model is a learning model that predicts behaviors of the vehicle. The memory stores a determination module including instructions that when executed by the one or more processors cause the one or more processors to compute a residual indicating an extent of correlation between the predicted response and the observed response. The determination module includes instructions to, in response to determining the residual satisfies a crash threshold that indicates an anomaly between the predicted response and the observed response, provide an alert indicating the vehicle has likely crashed.

In one embodiment, a non-transitory computer-readable medium for improving crash prediction through correlating an observed response and a predicted response of a vehicle and including instructions that, when executed by one or more processors, cause the one or more processors to perform one or more functions is disclosed. The instructions include instructions to generate the predicted response for the vehicle as a function of a response model and according to current vehicle inputs that are control inputs associated with steering, braking, and accelerating the vehicle. The response model is a learning model that predicts behaviors of the vehicle. The instructions include instructions to compute a residual indicating an extent of correlation between the predicted response and the observed response. The instructions include instructions to, in response to determining the residual satisfies a crash threshold that indicates an anomaly between the predicted response and the observed response, provide an alert indicating the vehicle has likely crashed.

In one embodiment, a method for improving crash prediction through correlating an observed response and a predicted response of a vehicle is disclosed. In one embodiment, the method includes generating the predicted response for the vehicle as a function of a response model and according to current vehicle inputs that are control inputs associated with steering, braking, and accelerating the vehicle. The response model is a learning model that predicts behaviors of the vehicle. The method includes computing a residual indicating an extent of correlation between the predicted response and the observed response. The method includes, in response to determining the residual satisfies a crash threshold that indicates an anomaly between the predicted response and the observed response, providing an alert indicating the vehicle has likely crashed.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
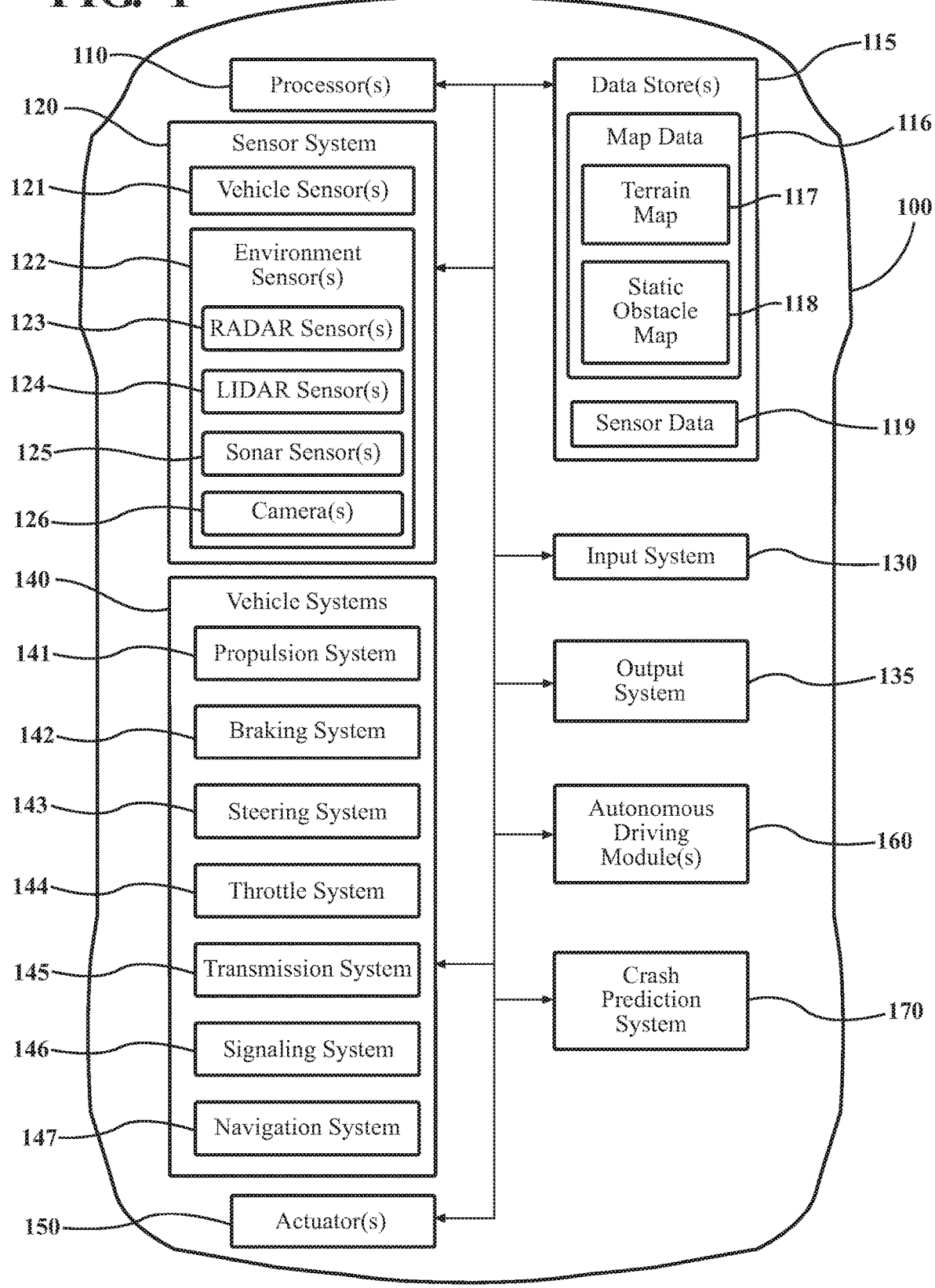
FIG. 1 illustrates one embodiment of a vehicle within which systems and methods disclosed herein may be implemented.

Systems, methods, and other embodiments associated with a manner of improving crash detection by predicting vehicle responses are disclosed. As previously noted, reliably detecting crash events associated with a vehicle is a task that may encounter various different difficulties. For example, existing safety systems may provide for detecting only events having particular characteristics (e.g., head on crashes exceeding a threshold speed that trigger physical crash sensors). Further difficulties may also occur in relation to using specific event information such as individual acceleration/deceleration events from an inertial measurement unit (IMU). For example, specific instances of peak threshold acceleration/deceleration may be associated with a strong braking, accelerating, or skidding event that do not necessarily correspond with a crash, yet various systems may still rely on such indicators in isolation, thereby resulting in false positives. As such, the determination of a crash from the noted systems is generally limited to specific types of crash events and, thus, may result in the detection of a limited set of crashes while failing to detect other occurrences or detecting non-crash events as false positives.

Therefore, in one aspect, the present approach improves crash detection by using multiple data sources (e.g., telematics data) to predict vehicle responses and correlating the predicted responses with observed responses thereby identifying when the vehicle is operating as expected or not to better detect occurrences of anomalous events (e.g., crashes). In one or more aspects, a disclosed crash prediction system uses sensor data (e.g., telematics data) that includes vehicle control inputs (e.g., steering, accelerator inputs, and braking inputs) and other information (e.g., dynamics) to predict a response of the vehicle. For example, as the vehicle proceeds along a path, the crash detection system may iteratively calculate the predicted response as a guidepost for identifying expected behavior of the vehicle over a defined temporal horizon (e.g., 1-2 seconds).

Accordingly, in one embodiment, the crash prediction system implements a model (e.g., a learning model) that accepts sensor data (e.g., vehicle control inputs, dynamics data, etc.) from the vehicle as an electronic input and produces the predicted response as an output. The predicted response may identify predicted yaw rates, lateral acceleration, longitudinal acceleration, and/or other operating characteristics of the vehicle at a subsequent time step. As the vehicle progresses to the subsequent time step, the crash prediction system can then observe actual responses of the vehicle. The crash prediction system generates the observed response from sensor data embodying the operation of the vehicle over the time step that can then serve as a point of comparison against the predicted response.

As such, the crash prediction system can then compare the predicted response with the observed response to generate a residual value that identifies an extent of correlation between the predicted and observed response. If the vehicle is operating as expected and has not encountered any anomalies (e.g., unexpected events such as a crash), then the predicted and observed response should closely correlate. However, if, for example, the residual satisfies a crash threshold (e.g., exceeds a defined difference/variance in a single value or a series of values over a time window) that indicates a lack of correspondence, then the crash prediction system concludes, in one approach, that the vehicle has encountered an anomaly in operation that may correlate with a crash.

Consequently, in at least one embodiment, to further validate the potential crash event, the crash prediction system performs a further analysis by analyzing sensor data about the operation of the vehicle from a time after the occurrence of the anomaly. This additional analysis may include analyzing sensor data about operation of the vehicle during a time subsequent to the observed response and in relation to a set of rules that define additional validating aspects of behaviors of the vehicle. In various approaches, the set of rules may include additional behavior identifications such as whether the vehicle has stopped moving, detection of peak acceleration forces, iterative occurrences of anomalies, activation of vehicle safety systems (e.g., traction control, ABS, etc.), and so on.

In any case, once identified, the crash prediction system may generate an alert about the crash event to facilitate a response and/or log information about the event for subsequent analysis. In various approaches, the alert may take different forms but generally includes notifying emergency services, recording/communicating data about the event, and so on. In this way, the disclosed system improves the identification of crash events through analysis of available telematics data thereby furthering safety of the vehicle and passengers riding therein.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any device that, for example, transports passengers and includes the noted sensory devices from which the disclosed predictions and determinations may be generated.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment, as discussed further subsequently.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a crash prediction system 170 that is implemented to perform methods and other functions as disclosed herein relating to improving crash detection in a vehicle. As will be discussed in greater detail subsequently, the crash prediction system 170, in various embodiments, may be implemented partially within the vehicle 100 and may further exchange communications with additional aspects of the system 170 that are remote from the vehicle 100 in support of the disclosed functions. Thus, while FIG. 2 generally illustrates the system 170 as being self-contained, in various embodiments, the system may be implemented within multiple separate devices some of which may be remote from the vehicle 100.

Figure 2:
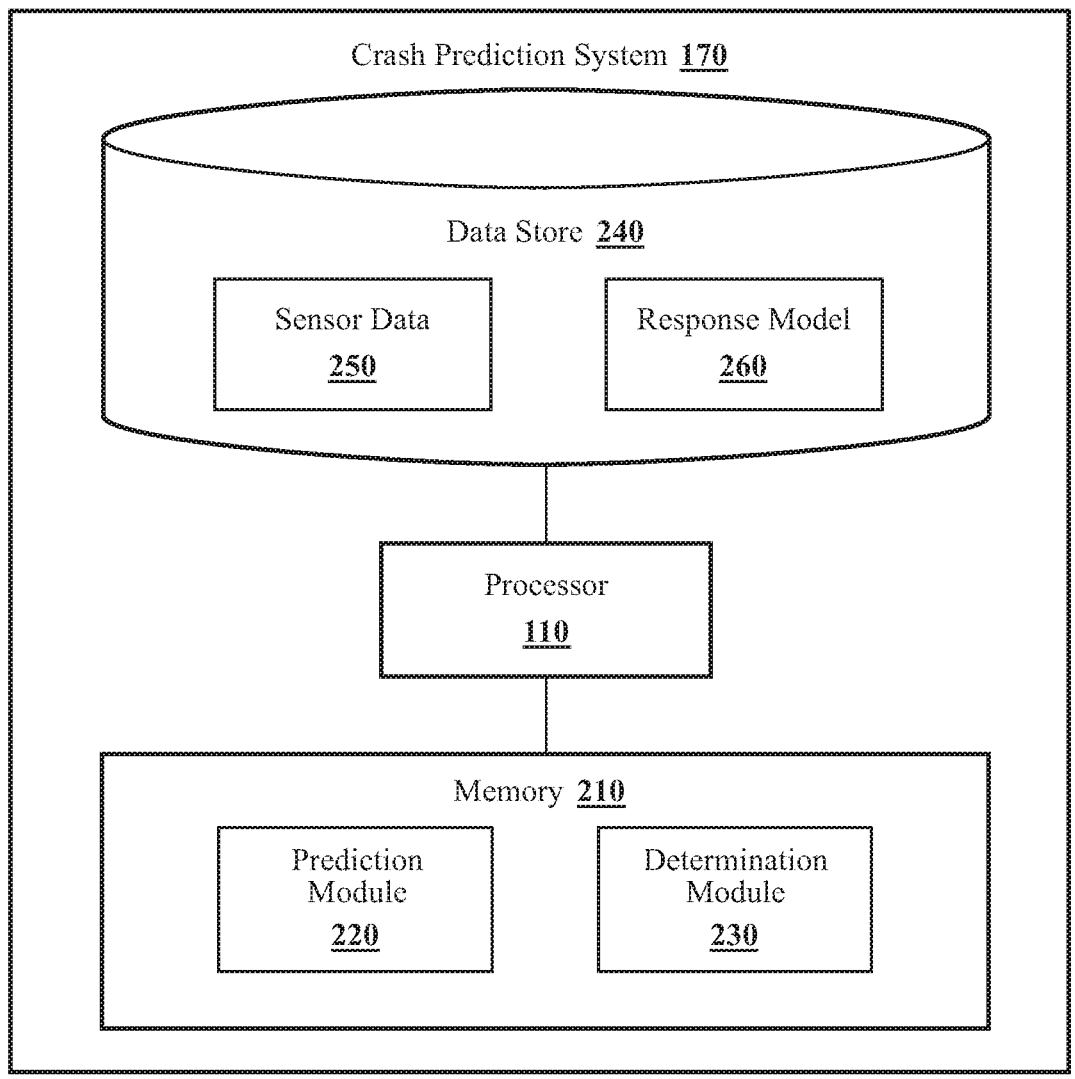
FIG. 2 illustrates one embodiment of a crash prediction system associated with predicting responses of a vehicle.

With reference to FIG. 2, one embodiment of the crash prediction system 170 of FIG. 1 is further illustrated. The crash prediction system 170 is shown as including a processor 110 from the vehicle 100 of FIG. 1. Accordingly, the processor 110 may be a part of the crash prediction system 170, the crash prediction system 170 may include a separate processor from the processor 110 of the vehicle 100, and/or the crash prediction system 170 may access the processor 110 through a data bus or another communication path. In further aspects, the processor 110 is a cloud-based resource that communicates with the system 170 through a communication network. In one embodiment, the crash prediction system 170 includes a memory 210 that stores a prediction module 220 and a determination module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions within the physical memory 210 that when executed by the processor 110 cause the processor 110 to perform the various functions disclosed herein.

Figure 3:
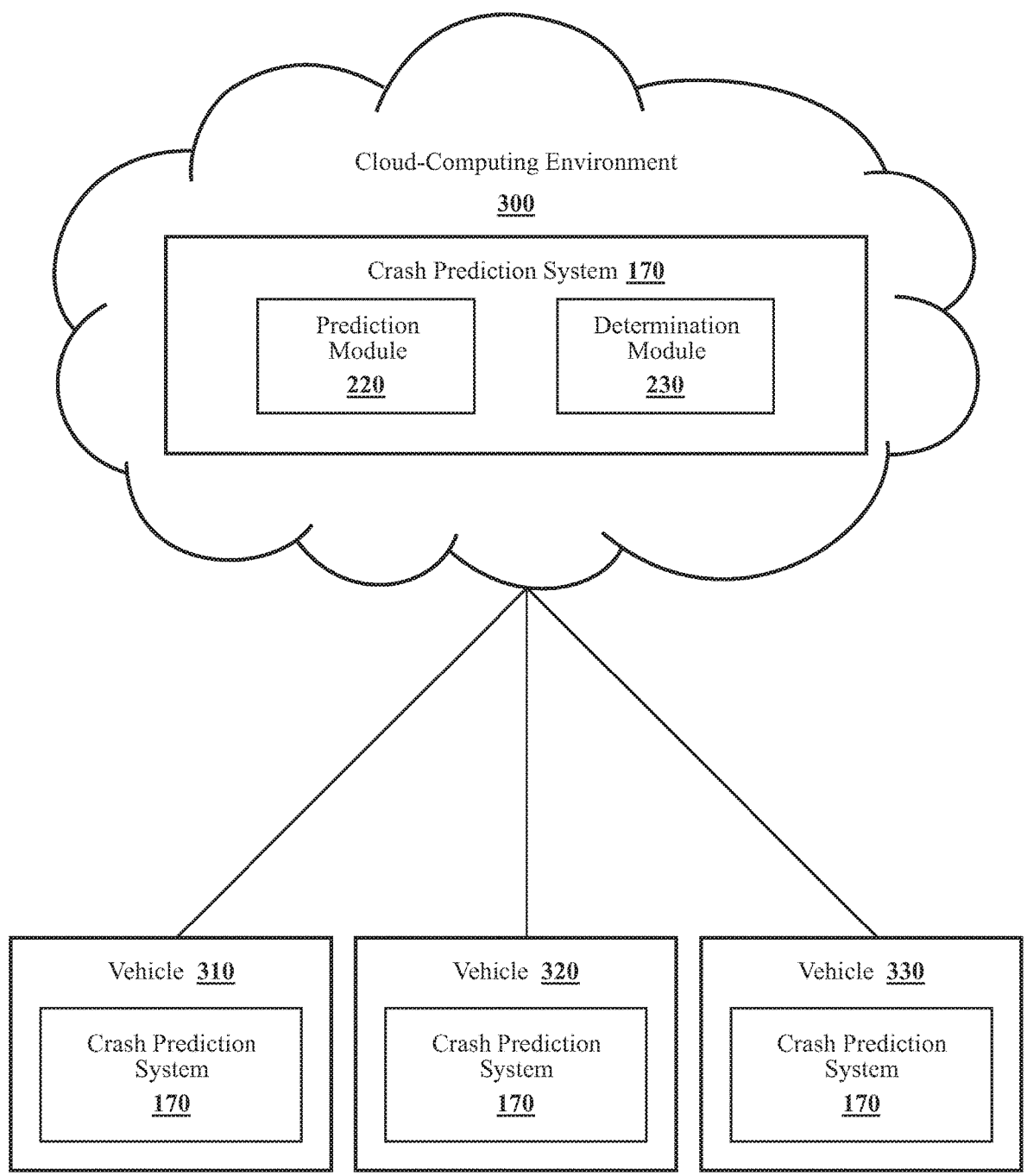
FIG. 3 illustrates a diagram of a crash prediction system in a cloud-based configuration.

The crash prediction system 170 may be further implemented as a cloud-based system that functions within a cloud-computing environment 300 as illustrated in relation to FIG. 3. That is, for example, the crash prediction system 170 may acquire telematics data (i.e., sensor data 250) from vehicles and execute as a cloud-based resource that is comprised of devices (e.g., distributed servers) remote from the vehicle 100 to predict responses and determine when a vehicle has encountered a crash. Accordingly, the crash prediction system 170 may communicate with vehicles (e.g., vehicles 310, 320, and 330) that are geographically distributed. In one approach, the cloud-based crash prediction system 170 collects the sensor data 250 from components or separate instances of the system 170 that are integrated with the vehicles 310-330. In one aspect, communications between the cloud 300 and the vehicles 310-330 may function as heartbeat signals to identify to the cloud 300 that the vehicles 310-330 are still operating.

Of course, along with the communications, the vehicles 310-330 provide the sensor data 250. As such, the cloud-based aspects of the system 170 may then process the sensor data 250 separately for the vehicles 310-330 to determine the differences between the predicted and observed responses. Of course, in further aspects, the vehicle-based systems may perform part of the processing while the cloud-computing environment 300 may handle a remaining portion or function to validate results of the vehicle-based systems 170. It should be appreciated that apportionment of the processing between the vehicle and the cloud may vary according to different implementations. Additional aspects of the cloud computing environment 300 will be discussed in relation to components of the system 170 and FIG. 2.

Continuing with FIG. 2, in one embodiment, the prediction module 220 includes instructions that function to control the processor 110 to generate a predicted response for the vehicle 100 as a function of a response model 260 and according to at least current vehicle inputs that are control inputs. The predicted response of the vehicle 100 indicates the expected behavior of the vehicle 100 according to the inputs over a defined time period into the future. The defined time period is, in one embodiment, 0.5 seconds into the future beyond a point in time for which the prediction module 220 has current sensor data 250. Of course, in further implementations, the prediction module 220 can be implemented to generate the predicted response according to different temporal horizons such as one, two, three, or more seconds into the future, which may be associated with varying degrees of error.

The predicted response itself defines, in one or more approaches, operating characteristics, which are generally dynamics of the vehicle 100, associated with steering, braking, and accelerating the vehicle 100. That is, the predicted response may include lateral acceleration, longitudinal acceleration, and a yaw rate. In further approaches, the predicted response may include further operating characteristics such as pitch rate, roll rate, and vertical acceleration (e.g., gravitational-axis component accelerations such as additional downforce or negative g-forces). In any case, the response model 260 processes various electronic inputs acquired from the vehicle 100 to provide the predicted response.

The various electronic inputs originate from the vehicle 100, which may be stored in a data store 240 of the crash prediction system 170. Accordingly, in one embodiment, the crash prediction system 170 includes the data store 240. The data store 240 is, in one embodiment, an electronic data structure (e.g., a database) stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, response model 260 and or other information that is used by the modules 220 and 230.

Accordingly, the prediction module 220 and/or the determination module 230, in one embodiment, control respective sensors (e.g., IMU, input sensors, etc.) of the vehicle 100 to provide the data inputs in the form of the sensor data 250. Additionally, while the modules 220/230 are discussed as controlling the various sensors to provide the sensor data 250, in one or more embodiments, the modules 220/230 can employ other techniques to acquire the sensor data 250 that are either active or passive. For example, the prediction module 220 may passively sniff the sensor data 250 from a stream of electronic information provided by the various sensors to further components within the vehicle 100. Moreover, the modules 220/230 can undertake various approaches to fuse data from multiple sensors when providing the sensor data 250. Thus, the sensor data 250, in one embodiment, represents a combination of perceptions acquired from multiple sensors.

In general, the sensor data 250 includes at least the vehicle control inputs. The vehicle control inputs comprise, in one example, steering inputs (e.g., steering wheel angle, rate and direction of rotation, etc.), braking inputs (e.g., extent of brake pedal activation/pressure), and acceleration inputs (e.g., extent of accelerator pedal activation/pressure). In further aspects, the vehicle control inputs also specify transmission control inputs (e.g., gear selection), drive mode (e.g., 2-wheel drive, 4-wheel drive), engine/motor parameters (e.g., engine RPM, driving mode for hybrid vehicles, etc.), and so on. In yet further aspects, the sensor data 250 includes current dynamics data such as angular velocity, g-forces (e.g., longitudinal, lateral), speed profile, wheel speeds, activation controls (e.g., ABS activation, traction control activation, stability control activation, etc.), and so on.

Of course, depending on the sensors that the vehicle 100 includes, the available information that system 170 can harvest as the sensor data 250 may vary. As one example, according to a particular implementation, the vehicle 100 may include different versions of an IMU sensor that are separately capable of different measurements. That is, in one implementation, the IMU sensor may provide yaw rate, lateral acceleration, and longitudinal acceleration, whereas, in a separate implementation with a more robust IMU sensor, the IMU sensor may provide additional data such as pitch rates, roll rates, vertical acceleration, etc. As such, the modules 220/230 may, in one or more approaches, be configured to adapt to different electronic inputs depending on the availability of such information. Thus, as will be discussed in greater detail subsequently, the prediction module 220 may generate the predicted response with additional points of comparison when, for example, additional sensor inputs are available. As an additional note, telematics data as used herein generally encompasses the sensor data 250 and may include further information such as vehicle identifiers, location information (e.g., GPS position), and other information that may be useful in communicating with the cloud 300 or other entities for purposes of generating and providing alerts.

In any case, the prediction module 220 uses the response model 260 to generate the predicted response from at least a portion of the sensor data 250. In one embodiment, the response model 260 is a learning model that predicts behaviors of the vehicle 100. It should be appreciated that the prediction module 220, in combination with the response model 260, can form a computational model such as a machine learning model/algorithm, deep learning model, a neural network model, or another similar approach. In one embodiment, the response model 260 is a statistical model such as a regression learning model (e.g., multiple linear regression model, random forest, nonlinear regression, etc.) that estimates values of the vehicle response out to a time horizon. Accordingly, the response model 260 can be a polynomial regression (e.g., least weighted polynomial regression, multiple linear regression), least squares or another suitable approach.

Moreover, in alternative arrangements, the response model 260 is a probabilistic approach, such as a hidden Markov model. In either case, the prediction module 220, when implemented as a machine learning model or another model, in one embodiment, electronically accepts the sensor data 250 as an input. Accordingly, the prediction module 220 in concert with the response model 260 produce various determinations/assessments as an electronic output that characterize the noted aspects as, for example, separate electronic values. Additionally, as a further aspect, the system 170 may train the response model 260 to learn various parameters (e.g., hyper-parameters, coefficients, etc.) through a supervised learning process (i.e., with labeled data) or as may be otherwise suitable. Accordingly, in one or more aspects, the sensor data 250 may be logged, correlated with known crash events, and used to train and/or retrain the response model 260. As an additional note, the training may occur locally within the vehicle 100 or as a separate pre-configuration process in the cloud 300. Thus, in one embodiment, the response model 260 is trained according to specifics of the vehicle 100 itself including whether the vehicle is hauling a trailer, size/type of wheels (e.g., after-market modified tires/wheels versus manufacturer wheels), adaptations to aerodynamics of the particular vehicle (e.g., bike racks, spoilers, body kits, etc.), engine tuning, and other aspects that influence the dynamics of the vehicle 100. Moreover, in alternative arrangements, the response model 260 is a probabilistic approach, such as a hidden Markov model. In either case, the prediction module 220, when implemented as a machine learning model or another model, in one embodiment, electronically accepts the sensor data 250 as an input. Accordingly, the prediction module 220 in concert with the response model 260 produce various determinations/assessments as an electronic output that characterize the noted aspects as, for example, separate electronic values. Additionally, as a further aspect, the system 170 may train the response model 260 to learn various parameters (e.g., hyper-parameters, coefficients, etc.) through a supervised learning process (i.e., with labeled data) or as may be otherwise suitable. Accordingly, in one or more aspects, the sensor data 250 may be logged, correlated with known crash events, and used to train and/or retrain the response model 260. As an additional note, the training may occur locally within the vehicle 100 or as a separate pre-configuration process in the cloud 300. Thus, in one embodiment, the response model 260 is trained according to specifics of the vehicle 100 itself including whether the vehicle is hauling a trailer, size/type of wheels (e.g., after-market modified tires/wheels versus manufacturer wheels), adaptations to aerodynamics of the particular vehicle (e.g., bike racks, spoilers, body kits, etc.), engine tuning, and other aspects that influence the dynamics of the vehicle 100.

Continuing with the discussion of FIG. 2, the response model 260, in one or more embodiments, may include separate sub-models associated with the separate aspects of the predicted response. In one approach, the response model 260 includes a separate output-specific model for each separate component of the predicted response. Thus, in an instance where the prediction module 220 is to generate the predicted response with a yaw rate, lateral acceleration, and longitudinal acceleration, the response model 260 includes a separate yaw model that predicts the yaw rate, a separate lateral model that predicts the lateral acceleration, and a separate longitudinal model that predicts the longitudinal acceleration of the vehicle 100. In further aspects, the response model 260 includes further sub-models where the predicted response is to include further modeled aspects of the vehicle 100.

In yet a further aspect of the response model 260, the response model 260, in at least one embodiment, is a situation-specific model. In other words, depending on characteristics of the current sensor data 250, the prediction model 220, for example, selects a different response model 260 from a set of situational models. By way of example, the prediction module 220, in one approach, selects the response model 260 from the set according to current combinations of vehicle control inputs. Thus, the prediction module 220 may select a first model when the current vehicle inputs include only accelerator pedal input (i.e., neutral steering and no braking input), a second model when the current vehicle inputs include only brake pedal input, i.e., neutral steering and no accelerator input), and a third model associated with when the current vehicle inputs indicate no values for either the braking input and the accelerator input.

It should be appreciated that while three separate examples are provided, the prediction module 220 can use different combinations of the vehicle control inputs and other operating characteristics of the vehicle 100 embodied in the sensor data 250 to identify and select a particular response model 260 to use when generating the predicted response. Moreover, the prediction module 220 generally selects the response model 260 with, for example, each separate observation of the sensor data 250. Thus, as the prediction module 220 generates subsequent predictions, the module 220 undertakes the selection process for the response model 260 according to separate acquisitions of the sensor data 250.

Continuing with FIG. 2, in one embodiment, the determination module 230 includes instructions that, when executed by the one or more processors 110, cause the one or more processors 110 to compute a residual indicating an extent of correlation between the predicted response and the observed response. However, in order to compute a value for the residual, the determination module 230 first acquires the observed response of the vehicle 100. Thus, as previously outlined, the determination module 230 acquires the sensor data 250 for a time at the temporal horizon that corresponds with a point in time of the predicted response. Consequently, the determination module 230 acquires the sensor data 250 subsequent to the sensor data 250 used to compute the predicted response (e.g., 0.5 seconds after). Furthermore, the determination module 230 may generate the residuals over a time series (e.g., a sliding window of time) and provide the residuals as a characterization of operation for a given time window.

Similar to the predicted response, the observed response is comprised of specific operating characteristics of the vehicle 100. As a general principle, the determination module 230 acquires the sensor data 250 and generates the observed response to mirror the predicted response in the elements included therein. Thus, where the predicted response includes the yaw rate, the lateral acceleration, and the longitudinal acceleration of the vehicle 100, the determination module 230 similarly generates the observed response from the sensor data 250 to include matching elements. As such, when the prediction module 220 generates the predicted response to include further or fewer elements, the determination module 230 matches the generated elements in order to facilitate the subsequent comparison.

Accordingly, once the determination module 230 generates the observed response, the determination module 230 proceeds with computing the residual. In one embodiment, the determination module 230 generates the residual by comparing the observed response with the predicted response on an element by element basis. The comparison may include a direct differencing operation (e.g., observed response−predicted response=residual) or a more complex heuristic that separately weighs the different elements, combines separate differences for the elements into a single residual value (e.g., a weighted average), or involves other statistical tests based on norm thresholding (e.g., norm 1, 2, or infinity).

The determination module 230 can then use the residual to determine whether the predicted response and the observed response correspond or not through a further comparison with a crash threshold. In yet further aspects, the determination module 230 can use multiple residuals over a time series in comparison to the crash threshold to determine whether the vehicle 100 is experiencing an anomaly. The crash threshold is, for example, a defined value that indicates a limit in a lack of correspondence between the predicted and observed responses before taking further action. That is, the crash threshold defines, in one embodiment, an extent to which the predicted response and the observed response are distinct (i.e., fail to correlate) prior to indicating further action should be undertaken. Thus, the crash threshold may indicate a percentage, an actual disparity value, or another metric by which the determination module 230 can determine correspondence between the responses. Additionally, as used herein, satisfying the crash threshold can include equaling the threshold, exceeding the threshold, and/or meeting criteria of one or more rules/functions as may be defined by a particular implementation. In the instance of a more complex criteria, the determination module 230 may determine whether the residual(s) satisfy the crash threshold through an analysis involving a statistical test such as a median filter, a norm 1, norm 2, norm infinity function, a thresholding filter, or another suitable analysis for identifying when the residual satisfies the crash threshold and, thus, corresponds with an anomaly.

Consequently, when the determination module 230 determines that the residual satisfies the crash threshold, then the crash prediction system 170 has effectively identified an anomaly in the operation of the vehicle 100 since the predicted response does not adequately correspond with the observed response. In any case, the determination module 230 compares the residual with the crash threshold to identify whether the extent of the correlation indicates a disparity that corresponds to the anomaly, where the anomaly indicates that the observed response does not correlate with the predicted response. In one or more embodiments, such a determination may be considered sufficient to generate an alert, while in further embodiments, the determination module 230 undertakes a further analysis to validate the anomaly. Moreover, the anomaly itself may correspond with a crash, or another unexpected event such as a skidding event (e.g., the vehicle 100 contacting a low friction portion of the roadway and sliding), the presence of debris in the roadway, and so on. Accordingly, the determination module 230 may further validate the anomaly prior to issuing an alert.

For example, in one embodiment, the determination module 230, in one or more aspects, undertakes an analysis of the sensor data from a time subsequent (e.g., spanning 30 seconds thereafter) to the anomaly to validate whether a crash has actually occurred. That is, even though the predicted response and the observed do not necessarily correlate, various aberrations that are not crashes may still cause such anomalies such as a strong jerk of the steering wheel, a quick acceleration, etc. With this being the case, the determination module 230 uses, in one or more aspects, a set of rules to further validate the anomaly.

By way of example, the set of rules can include various additional operating characteristics of the vehicle 100 that are considered to confirm the occurrence or at least increase a likelihood of the occurrence of a crash. Thus, in various approaches, the set of rules may include whether one or more safety systems (e.g., airbags, traction control, anti-lock braking, stability control, restraint sensors, etc.) of the vehicle 100 have been activated, detection of forces exceeding a peak threshold (e.g., IMU sensor detecting lateral acceleration forces exceeding a defined threshold), the vehicle stopping, an occurrence of multiple anomalies (i.e., the system 170 detecting the residual satisfying the crash threshold) in succession, and so on. In an embodiment where the determination module 230 further determines correspondence with non-crash events (i.e., skidding, debris, etc.), the rules can define subsequent expected actions such as return to normal operation, peak thresholds in steering to maneuver the vehicle 100 back to an expected position, and so on.

It should be appreciated the preceding list is provided for purposes of explanation only as an example set of rules and is not intended to be a comprehensive listing of possible rules. Moreover, the determination module 230, in one approach, proceeds with generating an alert as subsequently discussed upon identifying at least one of the rules being satisfied. In further aspects, the determination module 230 follows a policy for determining whether an adequate number of the rules have been satisfied prior to proceeding with generating the alert. For example, in one approach, the determination module 230 may weigh the rules differently according to a type or associated aspect of the vehicle 100 that is related to rule. As one example, the determination module 230 may consider deployment of the airbags as being sufficient to validate the anomaly. As another example, the determination module 230 may consider the vehicle 100 stopping in combination with the detection of two successive anomalies as being adequate. The particular arrangement of rules is generally defined according to the policy and may be done on the basis of a particular implementation.

In any case, the determination module 230, in response to detecting the anomaly and the one or more rules being satisfied, proceeds with generating an alert. The alert is, for example, an indication by the crash prediction system 170 that the vehicle has likely crashed. As a general matter, the crash prediction system 170 generates the alert on the basis of the previously described determinations, and thus provides the alert according to the assertion that the vehicle has crashed with a high likelihood of accuracy. Of course, in an embodiment associated with generating the alert for non-crash events, the determination module 230 generates the alert to include information associated with the anomaly and further provides the alert in a fashion consistent with the non-crash event (e.g., logs the associated information).

As such, the determination module 230 may perform various actions as part of providing the alert. For example, in one embodiment, the determination module 230 provides a confirmation request to a passenger/driver of the vehicle 100 to confirm the crash. Thus, if the passenger/driver responds affirmatively or does not respond in a defined time period, then the determination module 230, in one embodiment, proceeds with additional actions such as communicating the alert to emergency services or other emergency contacts. Of course, in further embodiments, the determination module 230 may perform additional actions without providing a confirmation message.

In any case, the determination module 230, in one or more embodiments, generates the alert by electronically communicating the alert to one or more safety services (e.g., EMS, Fire, police, etc.), logging information and communicating the information to an OEM or other repository for storing crash data, and so on. In this way, the crash prediction system 170 improves safety of vehicle occupants through more reliable crash detection from which many different mitigating actions may be better implemented.

Figure 4:
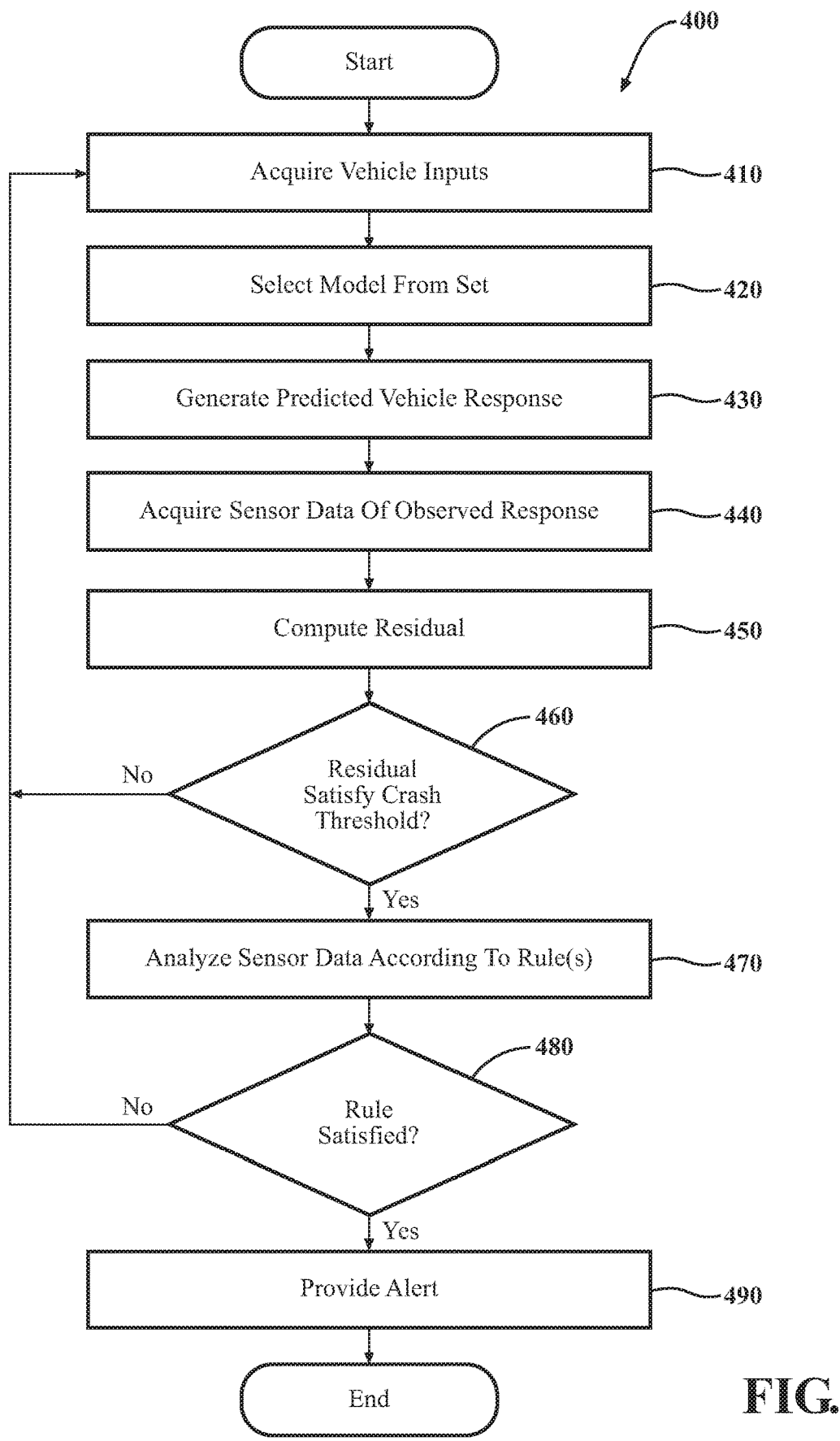
FIG. 4 is a flowchart illustrating one embodiment of a method associated with improving crash prediction for a vehicle.

FIG. 4 illustrates a flowchart of a method 400 that is associated with improving crash prediction through correlating an observed response and a predicted response of a vehicle. Method 400 will be discussed from the perspective of the crash prediction system 170 of FIGS. 1-2. While method 400 is discussed in combination with the crash prediction system 170, it should be appreciated that the method 400 is not limited to being implemented within the crash prediction system 170 but is instead one example of a system that may implement the method 400. Of course, while the method is illustrated as a generally serial process, various aspects of the method 400 can execute in parallel to perform the noted functions.

At 410, the crash prediction system 170 acquires the sensor data 250 including at least vehicle control inputs. In one embodiment, the crash prediction system 170 controls the sensor system 120 to acquire the sensor data 250 from various sensors within the vehicle 100 that inform the determination of whether a crash has occurred. For example, in at least one approach, the crash prediction system 170 acquires the sensor data 250 about vehicle control inputs (e.g., steering angle, accelerator pedal pressure, brake pedal pressure, transmission gear position, etc.). While pedal pressures and steering wheel positions are generally discussed throughout this disclosure, it should be appreciated that the crash prediction system 170 can function with manually driven vehicles, semi-autonomous vehicles, or fully autonomous vehicles. Thus, in the instance of a semi or fully autonomous vehicle, the crash prediction system 170 acquires the sensor data 250 about automated inputs that may be electronically actuated as opposed to manually driven by pedals and/or steering wheels. However, the general attributes of the information are similar and generally compatible.

In addition to vehicle input controls, the crash prediction system 170, in one or more approaches, acquires additional sensor data 250 including speed, engine rpm, wheel speeds, g-forces, safety system activation controls, and so on. Moreover, the system 170 controls the sensors to acquire the sensor data 250 at successive iterations or time steps. Thus, the system 170, in one embodiment, iteratively executes the functions discussed at blocks 410-460 to acquire the sensor data 250 and provide information therefrom. Furthermore, the system 170, in one embodiment, executes one or more of the noted functions in parallel for separate observations in order to maintain updated sensor data 250 and determinations about the operation of the vehicle 100. In one aspect, the crash prediction system 170 may be generating predicted responses according to current sensor data 250 while comparing prior predicted responses with observed responses in parallel. Thus, in one approach, the crash prediction system 170 may execute multiple iterations of the method 400 in parallel.

At 420, the system 170 selects the response model 260 from a set of situational models according to the current vehicle control inputs. As previously described, the response model 260 is, in one embodiment, specific to the particular control inputs that are presently applied to the vehicle 100. Thus, prior to predicting the response, the system 170 selects a model that is trained according to the circumstances under which the vehicle 100 is presently operating. In any case, all of the models in the set are, for example, machine learning models such as linear or non-linear learning-based regression models.

At 430, the system 170 generates the predicted response for the vehicle 100 as a function of the selected response model 260 and according to at least current vehicle inputs. By way of example, in the instance of a longitudinal sub-model of the response model 260, the system 170 uses different aspects of the sensor data 250 as inputs depending on the selected model. Thus, where the inputs indicate only accelerator pedal pressure, the system 170 uses the accelerator pressure value, vehicle speed, and engine RPM as electronic inputs to the longitudinal sub-model. In the instance of only brake pedal inputs, the system 170 uses brake pedal pressure as input to the sub-model. Additionally, in the instance of neither accelerator inputs nor brake pedal inputs, the system 170 uses the vehicle speed, and engine RPM as electronic inputs to the sub-model. Separately, yaw rate sub-models and lateral acceleration sub-models may use electronic inputs including vehicle speed, wheel speeds, and steering angle. The respective models can then process the noted electronic inputs to generate the predicted response that includes at least yaw rate, lateral acceleration, and longitudinal acceleration.

At 440, the system 170 acquires further sensor data 250 that corresponds with the observed response. In one embodiment, the system 170 acquires sensor data embodying the observed response to characterize operating characteristics of the vehicle at a point in time corresponding with the predicted response (e.g., 0.5 seconds beyond a time corresponding to data used to perform the predictions). As previously described, the system 170 generates the observed response to include a component-to-component correspondence with the predicted response. Thus, in the present example, the observed response includes the observed yaw rate, the observed lateral acceleration, and the observed longitudinal acceleration.

At 450, the system 170 computes a residual indicating an extent of correlation between the predicted response and the observed response. In one embodiment, the system 170 generates the residual by comparing the predicted response with the observed response. As previously noted, the precise form of this comparison may vary according to the implementation but is generally intended to determine when the predicted response correlates with the observed response (i.e., when the responses are similar). As such, the system 170 may implement the comparison through a simple differencing operation between separate corresponding components or through a more complex heuristic that distills the separate correlations/disparities into a single value. In any case, the residual reflects how closely the two responses correspond.

At 460, the crash prediction system 170 determines whether the residual satisfies the crash threshold. In one embodiment, the crash threshold defines a value of the residual beyond which the responses are not considered to correlate sufficiently, and, thus, indicate an instance in which an anomaly exists in the behavior of the vehicle 100. The crash threshold itself may be a percentage or other value that corresponds with the residual and identifies a limit on the failure of correlation between the responses. Thus, the crash prediction system 170 may determine whether the residual satisfies the crash threshold through a basic inequality comparison and/or using another heuristic. For example, in one approach, the crash prediction system 170 applies a statistical test such as a median filter, a norm 1, norm 2, norm infinity function, a thresholding filter, or another suitable analysis for identifying when the residual satisfies the crash threshold and, thus, corresponds with an anomaly. Additionally, it should be noted that while satisfying the crash threshold is generally discussed as being associated with a crash, in further aspects, the residual value may indicate other anomalies such as a presence of debris on the road, low friction of the road due to oil, ice, water, etc. Such further anomalies may be additionally confirmed by rules as further discussed at 470 (e.g., by comparing the braking/acceleration/turning performance with a baseline, if the residuals are consistently in one direction).

At 470, when the system 170 determines that the residual satisfies the crash threshold, the system 170 proceeds to analyze the sensor data 250 about operating characteristics of the vehicle 100 during a time subsequent to the observed response and according to a set of rules. In one embodiment, the system undertakes this additional analysis to validate whether the vehicle 100 has crashed (i.e., whether the anomaly actually corresponds with a crash). Moreover, as noted above, the set of rules specify one or more aspects about the operating characteristics of the vehicle 100 that correspond with the vehicle 100 crashing. The set of rules can include various conditions associated with operation of the vehicle 100 such as dynamics (i.e., the vehicle stops, strong jerking motions, etc.), identification of multiple successive anomalies, and so on.

At 480, the crash prediction system 170 determines whether one or more rules have been satisfied. In one embodiment, as previously explained, the crash prediction 170 determines which combinations of rules being satisfied are sufficient for validating the anomaly as a crash. Thus, depending on the particular implementation, a policy may indicate one or more particular rules that are to be satisfied (i.e. conditions met) in order to validate the anomaly and proceed with generating the alert at 490. That is, in one approach, depending on how the policy weighs different rules, a single rule and/or a combination of rules may need to be met in order to satisfy the policy and proceed.

At 490, the crash prediction system 170 provides an alert indicating the vehicle 100 has likely crashed. In one embodiment, the crash prediction system 170 provides the alert by electronically communicating the alert to one or more third-party services. The third-party services can include emergency response services (e.g., EMS, fire, road-side assistance, etc.), internal systems of the vehicle 100 (e.g., to cease operation thereby preventing fire or further damage), information logging services (e.g., block-box logging to identify information associated with the crash), emergency contacts, nearby vehicles via V2V or another communication network (for avoiding an area of the crash), and so on. In this way, the disclosed method 400 functions to improve the detection of crash events from which additional assisting services may be more reliably dispatched and/or otherwise utilized.

Figure 5:
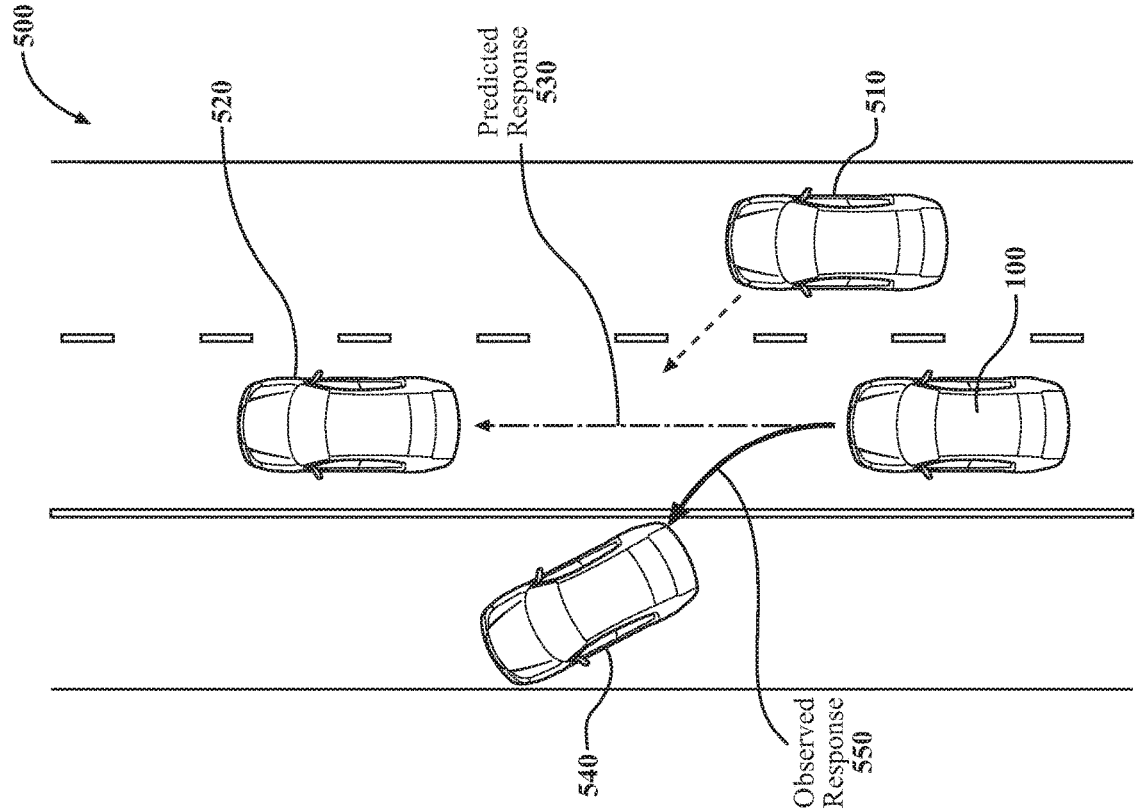
FIG. 5 is a diagram illustrating one example of an instance in which a predicted response varies from an observed response of a vehicle.

FIG. 5 illustrates an example of how the crash prediction system 170 may predict responses of the vehicle 100 and determine the occurrence of a crash. As shown in FIG. 5, a roadway 500 includes the vehicle 100 traveling in a center lane next to an adjacent vehicle 510. Thus, at a first instance in time, the vehicle 100 acquires sensor data of the vehicle 100 and generates a predicted response 530 that corresponds with an expected future position of the vehicle 100 shown by vehicle 520. However, when the vehicle 510 unexpectedly travels toward the vehicle 100, the vehicle 100 steers abruptly away from the vehicle 510 resulting in an observed response 550 associated with a different trajectory. As shown, the vehicle 540 represents the vehicle 100 at a subsequent time step. Thus, the crash prediction system 170 compares the predicted response 530 and the observed response 550 and identifies that the responses do not correlate. Thus, depending on subsequent behaviors of the vehicle 100 at a position 540 (e.g., collision with a curb, etc.), the crash prediction system 170 may indicate the occurrence of a crash.

Figure 6:
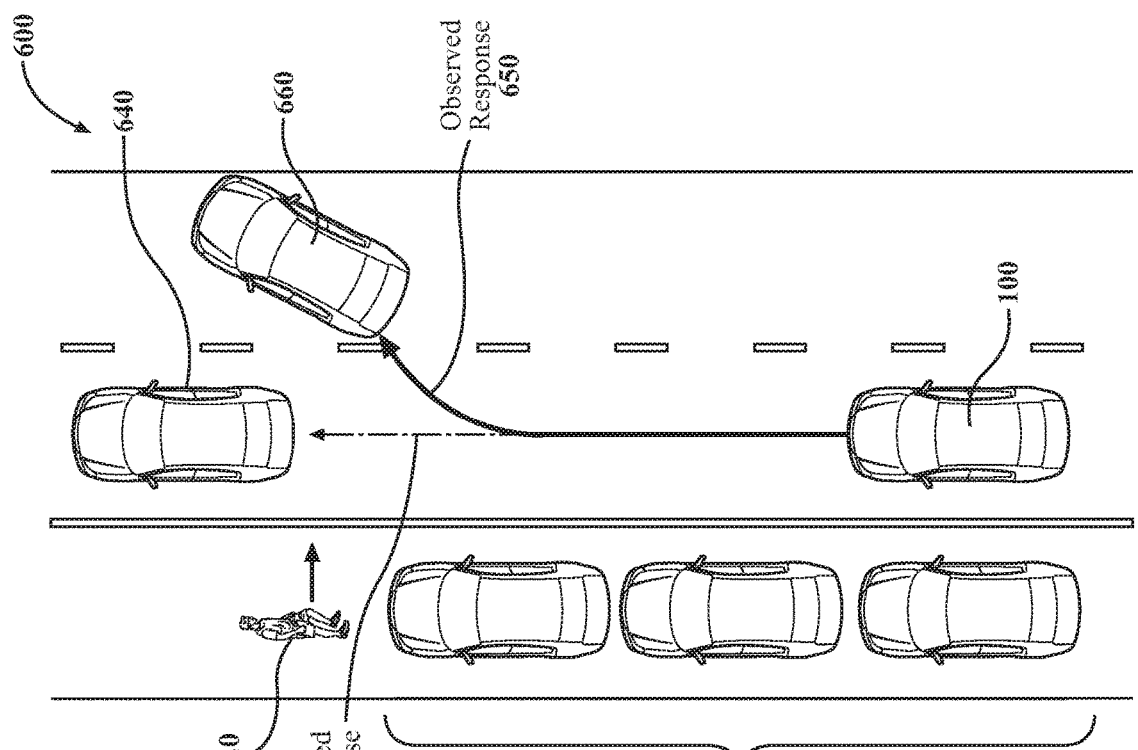
FIG. 6 is a diagram illustrating another example of an instance in which a predicted response varies from an observed response of a vehicle.

FIG. 6 illustrates another example of how the crash prediction system 170 may predict responses of the vehicle 100 and determine the occurrence of a crash. As shown in FIG. 6, a roadway 600 includes the vehicle 100 traveling in a center lane adjacent to a row of vehicles 610. Unseen by the vehicle 100 is a pedestrian 620 obscured by the vehicles 610. Thus, the crash prediction system 170 generates a predicted response 630 according to current sensor data that does not account for the pedestrian 620, and that would result in an expected position 640 for the vehicle 100. However, as the vehicle 100 proceeds at a subsequent time step, the pedestrian proceeds along a trajectory into the roadway 600 causing the vehicle 100 to quickly steer away from the pedestrian 620 resulting in an observed response 650 and a future position 660 that are quite distinct from the predicted response 630. Thus, the crash prediction system 170 compares the predicted response 630 and the observed response 650 and identifies that the responses do not correlate. Thus, depending on subsequent behaviors of the vehicle 100 at the position 660 and beyond (e.g., collision with another vehicle, curb, wall, ditch, etc.), the crash prediction system 170 may indicate the occurrence of a crash.

Figure 7:
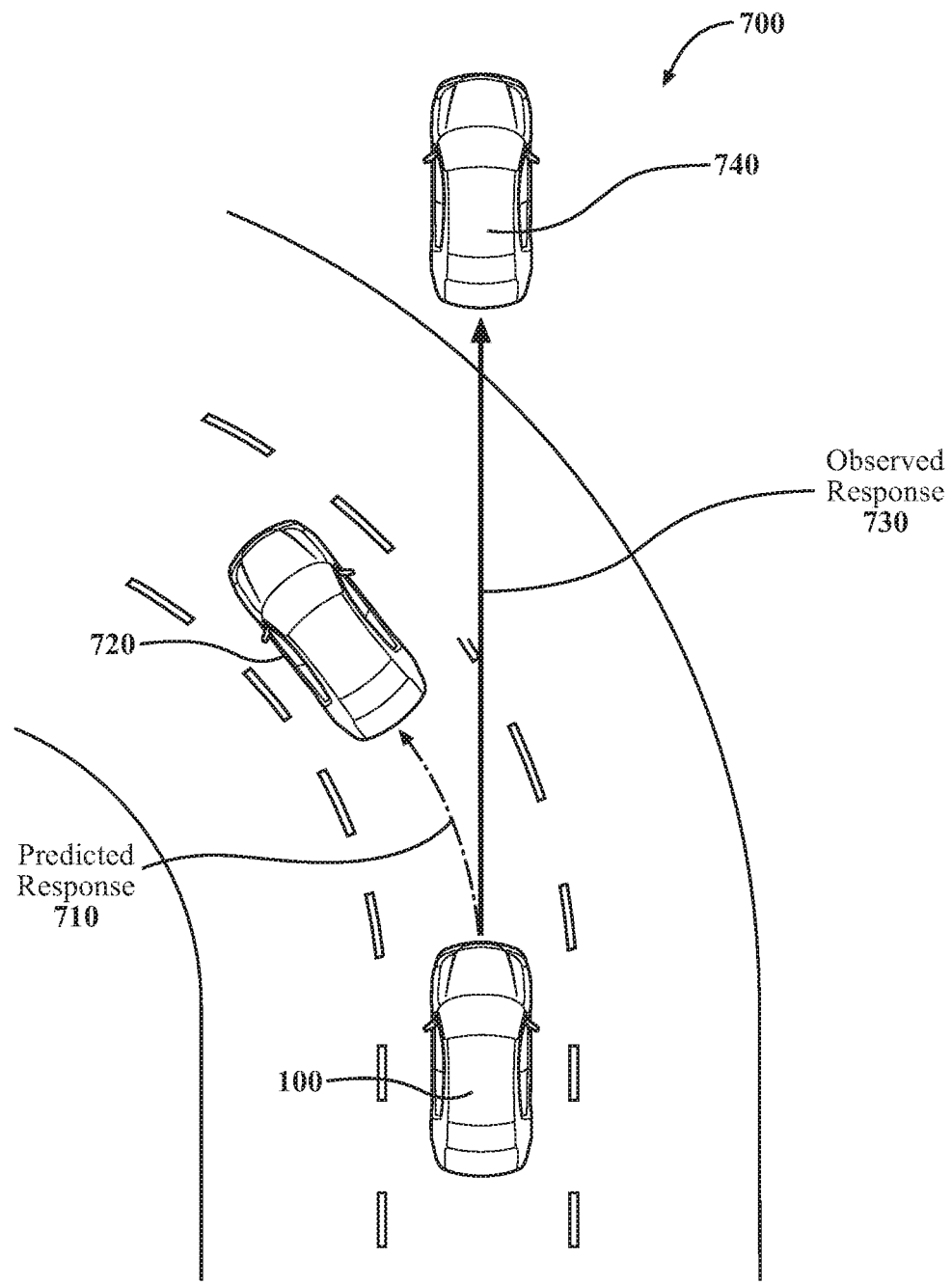
FIG. 7 is a diagram illustrating a further example of an instance in which a predicted response varies from an observed response of a vehicle.

FIG. 7 illustrates a further example of how the crash prediction system 170 may predict responses of the vehicle 100 and determine the occurrence of a crash. As shown in FIG. 7, a roadway 700 includes a leftward turning corner and includes the vehicle 100 traveling along the roadway 700. Further consider that the roadway may be slippery due to weather conditions such as rain or ice. Thus, at a first instance in time, the vehicle 100 acquires sensor data and generates a predicted response 710 that corresponds with a future position 720 for the vehicle 100 along the roadway 700.

However, when the vehicle 100 unexpectedly encounters a slippery section of the roadway 700 at the curve, an observed response 730 associated with the vehicle 100 shows how the vehicle 100 proceeds off of the curve to a position shown by 740. Thus, the crash prediction system 170 compares the predicted response 710 and the observed response 730 and identifies that the responses do not correlate. Thus, depending on subsequent behaviors of the vehicle 100 at a position 740 (e.g., vehicle stops off of the roadway) the crash prediction system 170 may indicate the occurrence of a crash. In this way, the crash prediction system 170 leverages the available sensor data to identify when the vehicle 100 has crashed and may then perform additional actions to improve the safety of the passengers such as dispatching emergency services, logging data to improve operation of the vehicle 100 under similar conditions subsequently, and so on.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and /or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the crash prediction system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the crash prediction system 170, and/or the autonomous driving module(s) 160 may control some or all of these vehicle systems 140 and, thus, may be partially or fully autonomous.

The processor(s) 110, the crash prediction system 170, and/or the autonomous driving module(s) 160 can be operatively connected to communicate with the various vehicle systems 140 and/or individual components thereof. For example, returning to FIG. 1, the processor(s) 110, the crash prediction system 170, and/or the autonomous driving module(s) 160 can be in communication to send and/or receive information from the various vehicle systems 140 to control the movement, speed, maneuvering, heading, direction, etc. of the vehicle 100. The processor(s) 110, the crash prediction system 170, and/or the autonomous driving module(s) 160 may control some or all of these vehicle systems 140.

The processor(s) 110, the crash prediction system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the crash prediction system 170, and/or the autonomous driving module(s) 160 can control the direction and/or speed of the vehicle 100. The processor(s) 110, the crash prediction system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the crash prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A crash prediction system for improving crash prediction through correlating an observed response and a predicted response of a vehicle, comprising:
   one or more processors;
   a memory communicably coupled to the one or more processors and storing:
   a prediction module including instructions that when executed by the one or more processors cause the one or more processors to:
      select a response model from a set of situational models by using vehicle inputs to identify which of the situational models to apply as the response model for a current observation corresponding to the vehicle inputs at a first time, wherein separate ones in the set of situational models correspond to different combinations of the vehicle inputs, wherein the response model is comprised of separate sub-models for different aspects of the predicted response including a yaw model that predicts a yaw rate at a second time, a lateral model that predicts a lateral acceleration at the second time, and a longitudinal model that predicts longitudinal acceleration of the vehicle at the second time, and
      generate the predicted response for the vehicle as a function of the response model and according to the vehicle inputs that indicate control inputs for steering, braking, and accelerating the vehicle, wherein the response model is a learning model that predicts behaviors of the vehicle and the vehicle inputs are from the first time; and
   a determination module including instructions that when executed by the one or more processors cause the one or more processors to:
      compute a residual indicating an extent of correlation between the predicted response and the observed response that is from the second time subsequent to the first time and corresponding to a prediction horizon of the response model, and
      in response to determining the residual satisfies a crash threshold that indicates an anomaly between the predicted response and the observed response, provide an alert indicating the vehicle has likely crashed, wherein the prediction module executes in parallel to generate the predicted response and compute the residual execute in parallel according to separate iterations of acquiring the vehicle inputs and the observed response.

2. The crash prediction system of claim 1, wherein the determination module includes instructions to determine whether the residual satisfies the crash threshold including instructions to:
   compare the residual with the crash threshold to identify whether the extent of the correlation indicates a disparity that corresponds to the anomaly, the anomaly indicating that the observed response does not correlate with the predicted response, and
   analyze sensor data about operating characteristics of the vehicle during a time subsequent to the observed response according to a set of rules to validate whether the vehicle has crashed prior to generating the alert.

3. The crash prediction system of claim 2, wherein the set of rules specify one or more aspects of the operating characteristics of the vehicle that correspond with the vehicle crashing including activation of vehicle safety systems, detection of forces exceeding a peak threshold, the vehicle stopping, and an occurrence of multiple anomalies in succession, and
   wherein the time subsequent to the observed response is at least thirty seconds in duration.

4. The crash prediction system of claim 1, wherein the set of situational models include at least a first model associated with when the vehicle inputs include only accelerator pedal input, a second model associated with when the vehicle inputs include only brake pedal input, and a third model associated with when the vehicle inputs indicate no values for the brake pedal input and the accelerator pedal input.

5. The crash prediction system of claim 1, wherein the separate sub-models of the response model are machine learning models.

6. The crash prediction system of claim 1, wherein the predicted response and the observed response include the yaw rate, the lateral acceleration, and the longitudinal acceleration of the vehicle, and wherein the determination module includes instructions to compute the residual as a difference between the yaw rate, the lateral acceleration, and the longitudinal acceleration of the predicted response and the observed response, respectively.

7. The crash prediction system of claim 1, wherein the determination module includes instructions to compute the residual including instructions to acquire the observed response from at least one sensor of the vehicle to characterize operating characteristics of the vehicle at a point in time corresponding with the predicted response.

8. The crash prediction system of claim 1, wherein the determination module includes instructions to provide the alert including instructions to communicate the alert to a passenger of the vehicle to confirm the vehicle has crashed, and, in response to receiving a confirmation that the vehicle has crashed, communicating the alert to one or more safety services,
   wherein the prediction module includes instructions to generate the predicted response including instructions to acquire sensor data from at least one sensor in the vehicle that characterizes at least the control inputs.

9. A non-transitory computer-readable medium for improving crash prediction through correlating an observed response and a predicted response of a vehicle and storing instructions that when executed by one or more processors cause the one or more processors to:
  select a response model from a set of situational models by using vehicle inputs to identify which of the situational models to apply as the response model for a current observation corresponding to the vehicle inputs at a first time,
    wherein separate ones in the set of situational models correspond to different combinations of the vehicle inputs, wherein the response model is comprised of separate sub-models for different aspects of the predicted response including a yaw model that predicts a yaw rate at a second time, a lateral model that predicts a lateral acceleration at the second time, and a longitudinal model that predicts longitudinal acceleration of the vehicle at the second time;
  generate the predicted response for the vehicle as a function of the response model and according to the vehicle inputs that indicate control inputs for steering, braking, and accelerating the vehicle, wherein the response model is a learning model that predicts behaviors of the vehicle and the vehicle inputs are from the first time;
  compute a residual indicating an extent of correlation between the predicted response and the observed response; and
  in response to determining the residual satisfies a crash threshold that indicates an anomaly between the predicted response and the observed response, provide an alert indicating the vehicle has likely crashed, wherein the instructions to generate the predicted response and compute the residual execute in parallel according to separate iterations of acquiring the vehicle inputs and the observed response.

10. The non-transitory computer-readable medium of claim 9, further including instructions to determine whether the residual satisfies the crash threshold including instructions to compare the residual with the crash threshold to identify whether the extent of the correlation indicates a disparity that corresponds to the anomaly, the anomaly indicating that the observed response does not correlate with the predicted response.

11. The non-transitory computer-readable medium of claim 9, further including instructions to determine whether the residual satisfies the crash threshold further including instructions to analyze sensor data about operating characteristics of the vehicle during a time subsequent to the observed response according to a set of rules to validate whether the vehicle has crashed prior to generating the alert.

12. The non-transitory computer-readable medium of claim 11, wherein the set of rules specify one or more aspects of the operating characteristics of the vehicle that correspond with the vehicle crashing including activation of vehicle safety systems, detection of forces exceeding a peak threshold, the vehicle stopping, and an occurrence of multiple anomalies in succession, and
  wherein the time subsequent to the observed response is at least thirty seconds in duration.

13. The non-transitory computer-readable medium of claim 9,
  wherein the set of situational models includes at least a first model associated with when the vehicle inputs include only accelerator pedal input, a second model associated with when the vehicle inputs include only brake pedal input, and a third model associated with when the vehicle inputs indicate no values for the brake pedal input and the accelerator pedal input.

14. A method of improving crash prediction through correlating an observed response and a predicted response of a vehicle, comprising:
  selecting, using a prediction module, a response model from a set of situational models by using vehicle inputs to identify which of the situational models to apply as the response model for a current observation corresponding to the vehicle inputs at a first time, wherein separate ones in the set of situational models correspond to different combinations of the vehicle inputs, wherein the response model is comprised of separate sub-models for different aspects of the predicted response including a yaw model that predicts a yaw rate, a lateral model that predicts a lateral acceleration, and a longitudinal model that predicts longitudinal acceleration of the vehicle;
  generating, using the prediction module, a predicted response for the vehicle as a function of the response model and according to the vehicle inputs that indicate control inputs for steering, braking, and accelerating the vehicle, wherein the response model is a learning model that predicts behaviors of the vehicle;
  computing, using a determination module, a residual indicating an extent of correlation between the predicted response and the observed response that is from a second time subsequent to the first time and corresponding to a prediction horizon of the response model; and
  in response to determining the residual satisfies a crash threshold that indicates an anomaly between the predicted response and the observed response, providing, using the determination module, an alert indicating the vehicle has likely crashed, wherein generating the predicted response and computing the residual execute in parallel according to separate iterations of acquiring vehicle inputs and the observed response.

15. The method of claim 14, wherein determining the residual satisfies the crash threshold includes:
  comparing the residual with the crash threshold to identify whether the extent of the correlation indicates a disparity that corresponds to the anomaly, the anomaly indicating that the observed response does not correlate with the predicted response, and
  analyzing sensor data about operating characteristics of the vehicle during a time subsequent to the observed response according to a set of rules to validate whether the vehicle has crashed prior to generating the alert.

16. The method of claim 15, wherein the set of rules specify aspects of the operating characteristics of the vehicle that correspond with the vehicle crashing including activation of vehicle safety systems, detection of forces exceeding a peak threshold, the vehicle stopping, and an occurrence of multiple anomalies in succession, and
  wherein the time subsequent to the observed response is at least thirty seconds in duration.

17. The method of claim 14, wherein the set of situational models including at least a first model associated with when the vehicle inputs include only accelerator pedal input, a second model associated with when the vehicle inputs include only brake pedal input, and a third model associated with when the vehicle inputs indicate no values for the brake pedal input and the accelerator pedal input.

18. The method of claim 14, wherein the separate sub-models of the response model are machine learning models.

19. The method of claim 14, wherein the predicted response and the observed response include the yaw rate, the lateral acceleration, and the longitudinal acceleration of the vehicle, and
> wherein computing the residual includes acquiring the observed response from at least one sensor of the vehicle to characterize operating characteristics of the vehicle at a point in time corresponding with the predicted response.

20. The method of claim 14, wherein providing the alert includes communicating the alert to a passenger of the vehicle to confirm the vehicle has crashed, and, in response to receiving a confirmation that the vehicle has crashed, communicating the alert to one or more safety services,
> wherein generating the predicted response includes acquiring sensor data from at least one sensor in the vehicle that characterizes at least the control inputs.

* * * * *